United States Patent
O'Neill et al.

(10) Patent No.: US 10,461,360 B2
(45) Date of Patent: Oct. 29, 2019

(54) ELECTRODE COMPOSITIONS FOR SOLID-STATE BATTERIES

(71) Applicant: Wildcat Discovery Technologies, Inc., San Diego, CA (US)

(72) Inventors: Cory O'Neill, San Diego, CA (US); Bin Li, San Diego, CA (US); Alex Freigang, San Diego, CA (US); Deidre Strand, San Diego, CA (US)

(73) Assignee: Wildcat Discovery Technologies, Inc., San Diego, CA (US)

(*) Notice: Subject to any disclaimer, the term of this patent is extended or adjusted under 35 U.S.C. 154(b) by 0 days.

(21) Appl. No.: 15/639,937

(22) Filed: Jun. 30, 2017

(65) Prior Publication Data

US 2018/0006326 A1   Jan. 4, 2018

Related U.S. Application Data

(60) Provisional application No. 62/356,861, filed on Jun. 30, 2016.

(51) Int. Cl.

| | |
|---|---|
| *H01M 10/0525* | (2010.01) |
| *H01M 4/131* | (2010.01) |
| *C08G 65/08* | (2006.01) |
| *C08F 14/22* | (2006.01) |
| *H01M 4/62* | (2006.01) |
| *C01D 15/00* | (2006.01) |
| *C01G 35/00* | (2006.01) |
| *C01G 23/00* | (2006.01) |
| *C01F 17/00* | (2006.01) |

(Continued)

(52) U.S. Cl.
CPC ........ *H01M 10/0525* (2013.01); *C01D 15/00* (2013.01); *C08F 14/22* (2013.01); *C08G 65/08* (2013.01); *C09D 127/16* (2013.01); *H01M 4/13* (2013.01); *H01M 4/131* (2013.01); *H01M 4/62* (2013.01); *H01M 4/622* (2013.01); *H01M 4/623* (2013.01); *C01F 17/0043* (2013.01); *C01G 23/005* (2013.01); *C01G 35/006* (2013.01)

(58) Field of Classification Search
None
See application file for complete search history.

(56) References Cited

U.S. PATENT DOCUMENTS

| | | |
|---|---|---|
| 4,009,092 A | 2/1977 | Taylor |
| 4,722,877 A | 2/1988 | Sammells |

(Continued)

FOREIGN PATENT DOCUMENTS

| | | |
|---|---|---|
| CN | 103985900 A | 8/2014 |
| CN | 104600358 A | 5/2015 |

(Continued)

OTHER PUBLICATIONS

Inada et al. "Synthesis and properties of Al-free Li7-xLa3Zr2-xTaxO12 garnet related oxides". Solid State Ionics 262 (2014) 568-572. (Year: 2013).*

(Continued)

*Primary Examiner* — Christopher P Domone
(74) *Attorney, Agent, or Firm* — Philip S. Hof; The Small Patent Law Group, LLC

(57) ABSTRACT

An electrode formulation including a polymer, which can be ion-conducting or non-conducting; an ion-conducting inorganic material; a lithium salt; and optionally an additive salt.

16 Claims, 3 Drawing Sheets

(51) Int. Cl.
*C09D 127/16* (2006.01)
*H01M 4/13* (2010.01)

(56) References Cited

U.S. PATENT DOCUMENTS

| | | | |
|---|---|---|---|
| 5,300,374 | A | 4/1994 | Kgrawal et al. |
| 5,599,355 | A | 2/1997 | Nagasubramanian et al. |
| 6,822,065 | B1 | 11/2004 | Sanchez et al. |
| 2002/0197535 | A1 | 12/2002 | Dudley et al. |
| 2003/0094599 | A1 | 5/2003 | Le et al. |
| 2004/0029014 | A1 | 2/2004 | Hwang et al. |
| 2004/0106046 | A1 | 6/2004 | Inda |
| 2005/0132562 | A1 | 6/2005 | Saito et al. |
| 2006/0035148 | A1 | 2/2006 | Balaya et al. |
| 2007/0020527 | A1 | 1/2007 | Ehrismann et al. |
| 2008/0124630 | A1* | 5/2008 | Kim ............ H01M 4/362 429/213 |
| 2008/0248396 | A1 | 10/2008 | Jung et al. |
| 2008/0292963 | A1* | 11/2008 | Sato ............ H01M 4/661 429/218.1 |
| 2008/0318133 | A1 | 12/2008 | Matsuyama et al. |
| 2009/0104538 | A1 | 4/2009 | Wakihara et al. |
| 2009/0136830 | A1 | 5/2009 | Gordon |
| 2009/0191462 | A1 | 7/2009 | Matsui et al. |
| 2011/0177398 | A1 | 7/2011 | Affinito et al. |
| 2011/0300432 | A1* | 12/2011 | Snyder ............ H01M 4/485 429/149 |
| 2012/0094186 | A1 | 4/2012 | Chu et al. |
| 2012/0288770 | A1 | 11/2012 | Yokoyama |
| 2013/0026409 | A1 | 1/2013 | Baker et al. |
| 2013/0224570 | A1* | 8/2013 | Sasaki ............ H01M 4/133 429/163 |
| 2013/0260207 | A1 | 10/2013 | Uemura |
| 2013/0273437 | A1 | 10/2013 | Yoshioka et al. |
| 2013/0309570 | A1 | 11/2013 | Kim et al. |
| 2014/0106186 | A1* | 4/2014 | Dudney ............ H01M 4/0426 429/50 |
| 2014/0134483 | A1 | 5/2014 | Ouchi et al. |
| 2014/0170504 | A1 | 6/2014 | Baek et al. |
| 2014/0308570 | A1* | 10/2014 | Gaben ............ H01M 4/04 429/162 |
| 2014/0308576 | A1 | 10/2014 | Gaben et al. |
| 2014/0370398 | A1 | 12/2014 | Lee et al. |
| 2015/0171463 | A1* | 6/2015 | Liang ............ H01M 10/052 429/322 |
| 2015/0188187 | A1 | 7/2015 | Strand et al. |
| 2017/0047581 | A1* | 2/2017 | Lu ............ H01M 4/1391 |
| 2017/0077547 | A1 | 3/2017 | Takami et al. |
| 2017/0309914 | A1* | 10/2017 | Drews ............ H01M 4/362 |

FOREIGN PATENT DOCUMENTS

| | | |
|---|---|---|
| JP | 2011108499 A | 6/2011 |
| JP | 2015079702 A | 4/2015 |
| WO | 1997049106 A1 | 12/1997 |

OTHER PUBLICATIONS

Abouimrane, A., et al., "Solid Electrolyte Based on Succinonitrile and LiBOB Interface Stability and Application in Lithium Batteries", Journal of the Electrochemical Society, 154 (11) A1031-A1034 (2007).

Croce, F., et al., "Nanocomposite, PEO-LiBOB Polymer Electrolytes for Low Temperature, Lithium Rechargeable Batteries", Journal of New Materials for Electrochemical Systems 9, 3-9 (2006).

Egashira, Minato, et al., "Effects of the Surface Treatment of the Al2O3 Filler on the Lithium Electrode/Solid Polymer Electrolyte Interface Properties", Electrochimica Acta 52 (2006) 1082-1086.

Ghosh, Ayan, et al., "Block Copolymer Solid Battery Electrolyte with High Li-Ion Transference Number", Journal of the Electrochemical Society, 157 (7) A846-A849 (2010).

Sumathipala, H. H., et al., "High Performance PEO-based Polymer Electrolytes and their Application in Rechargeable Lithium Polymer Batteries", Ionics (2007) 13:281-286.

Teran, Alexander A., et al., "Effect of Molecular Weight on Conductivity of Polymer Electrolytes", Solid State Ionics 203 (2011) 18-21.

Wang, Congxiao, et al., "All Solid-State Li/LixMnO2 Polymer Battery Using Ceramic Modified Polymer Electrolytes", Journal of the Electrochemical Society, 149 (8) A967-A972 (2002).

Zhang, Ding, et al., "Electrochemical Stability of Lithium bis(oxatlato) borate Containing Solid Polymer Electrolyte for Lithium Ion Batteries", Journal of Power Sources 196 (2011) 10120-10125.

Inada, Ryoji, et al., "Synthesis and properties of Al-free Li7-xLa3Zr2-xTaxO12 garnet related oxides", Solid State Ionics, 262 (2014) 568-5723.

International Search Report & Written Opinion dated Dec. 7, 2017 in International application No. PCT/US2017/040391.

International Search Report & Written Opinion dated Oct. 11, 2017 in International application No. PCT/US2017/040374.

International Search Report & Written Opinion dated Mar. 5, 2018 in International application No. PCT/US2017/062845.

Winand, Jean-Marc et al., "Nouvelles Solutions Solides LI (MIV) 2-x (NIV)x(PO 4)3 (L=Li, Na M, N=Ge, Sn, Ti, Zr, Hf) Synthese et Etude par Diffraction x et Conductivite Ionique", Journal of Solid State Chemistry, 93, 1991, pp. 341-349.

* cited by examiner

ELECTRODE COMPOSITIONS FOR SOLID-STATE BATTERIES

BACKGROUND OF THE INVENTION

The present invention is in the field of battery technology and, more particularly, in the area of solid materials and composite materials for use in electrodes in electrochemical cells.

Conventional lithium ion batteries include a positive electrode (or cathode as used herein), a negative electrode (or anode as used herein), an electrolyte, and, frequently, a separator. The electrolyte typically includes a liquid component that facilitates lithium ion transport and, in particular, enables ion penetration into the electrode materials.

In contrast, so-called solid-state lithium ion batteries do not include liquid in their principal battery components. Solid-state batteries can have certain advantages over liquid electrolyte batteries, such as improvements in safety because liquid electrolytes often contain volatile organic solvents. Solid-state batteries offer a wider range of packaging configurations because a liquid-tight seal is not necessary as it is with liquid electrolytes.

Generally, batteries having a solid-state electrolyte can have various advantages over batteries that contain liquid electrolyte. For small cells, such as those used in medical devices, the primary advantage is overall volumetric energy density. For example, small electrochemical cells often use specific packaging to contain the liquid electrolyte. For a typical packaging thickness of 0.5 mm, only about 60 percent of the volume can be used for the battery with the remainder being the volume of the packaging. As the cell dimensions get smaller, the problem becomes worse.

Elimination of the liquid electrolyte facilitates alternative, smaller packaging solutions for the battery. Thus, a substantial increase in the interior/exterior volume can be achieved, resulting in a larger total amount of stored energy in the same amount of space. Therefore, an all solid-state battery is desirable for medical applications requiring small batteries. The value is even greater for implantable, primary battery applications as the total energy stored often defines the device lifetime in the body.

Further, solid-state batteries can use lithium metal as the anode, thereby dramatically increasing the energy density of the battery as compared to the carbon-based anodes typically used in liquid electrolyte lithium ion batteries. With repeated cycling, lithium metal can form dendrites, which can penetrate a conventional porous separator and result in electrical shorting and runaway thermal reactions. This risk is mitigated through the use of a solid nonporous electrolyte for preventing penetration of lithium dendrites and enabling the safe use of lithium metal anodes, which directly translates to large gains in energy density, irrespective of cathode chemistry.

However, solid-state batteries have not achieved widespread adoption because of practical limitations. For example, while polymeric solid-state electrolyte materials like PEO are capable of conducting lithium ions, their ionic conductivities are inadequate for practical power performance. Successful solid-state batteries require thin film structures, which reduce energy density. But, a battery with reduced energy density has limited utility.

Further, solid-state batteries tend to have a substantial amount or degrees of interfaces among the different solid components of the battery. The presence of such interfaces can limit lithium ion transport and impede battery performance. Interfaces can occur (i) between the domains of active material in the electrode and the polymeric binder, (ii) between the cathode and the solid electrolyte, and (iii) between the solid electrolyte and the anode structure. Poor lithium ion transport across these interfaces results in high impedance in batteries and a low capacity on charge or discharge.

In some instances, inorganic materials have been used to attempt to improve the performance of polymer solid-state electrolytes. For example, U.S. Patent Publication 2013/0026409 discloses a composite solid electrolyte with a glass or glass-ceramic inclusion and an ionically conductive polymer. However, this solid electrolyte requires a redox active additive. As another example, U.S. Pat. No. 5,599,355 discloses a method of forming a composite solid electrolyte with a polymer, salt, and an inorganic particle (such as alumina). The particles are reinforcing filler for solid electrolyte and do not transport lithium. As yet another example, U.S. Pat. No. 5,599,355 discloses a composite solid state electrolyte containing a triflate salt, PEO, and a lightweight oxide filler material. Again, the oxide filler is not a lithium ion conductor or intercalation compound.

More generally, ionically conductive polymers like PEO have been disclosed with the use of a lithium salt as the source of lithium ions in the solid electrolyte. For example, Teran et al., *Solid State Ionics* (2011) 18-21; Sumathipala et al., *Ionics* (2007) 13: 281-286; Abouimrane et al., *JECS* 154(11) A1031-A1034 (2007); Wang et al., *JECS,* 149(8) A967-A972 (2002); and Egashira et al., *Electrochimica Acta* 52 (2006) 1082-1086 each disclose different solid electrolyte formulations with PEO and a lithium salt as the source for lithium ions. Still further the last two references (Wang et al. and Egashira et al.) each disclose non-ion conducting inorganic nanoparticles that are believed to improve the ionic conductivity of the PEO film by preventing/disrupting polymer crystallinity.

Thus, most work on solid-state batteries has focused on the lithium-ion conductivity of the solid-state electrolyte layer. None of the prior art formulations both addresses all the limitations of solid-state batteries and provides the performance improvements seen in the embodiments disclosed below.

BRIEF SUMMARY OF THE INVENTION

Embodiments of the present invention include a lithium ion battery having an anode, a cathode comprising an electrode active material, and a solid-state electrolyte. The cathode includes a polymer, which can be non-conducting; an ion-conducting inorganic material; and optionally an additive salt. In certain preferred embodiments, the cathode comprises PVdF, lithium bis(trifluoromethanesulfonyl)imide, and $Li_{1.3}Ti_{1.7}Al_{0.3}(PO_4)_3$.

Embodiments of the invention include methods of making a solid-state electrode and a battery containing a solid-state electrode, as well as methods of conditioning and using such a battery.

DETAILED DESCRIPTION OF THE INVENTION

Figure 1:
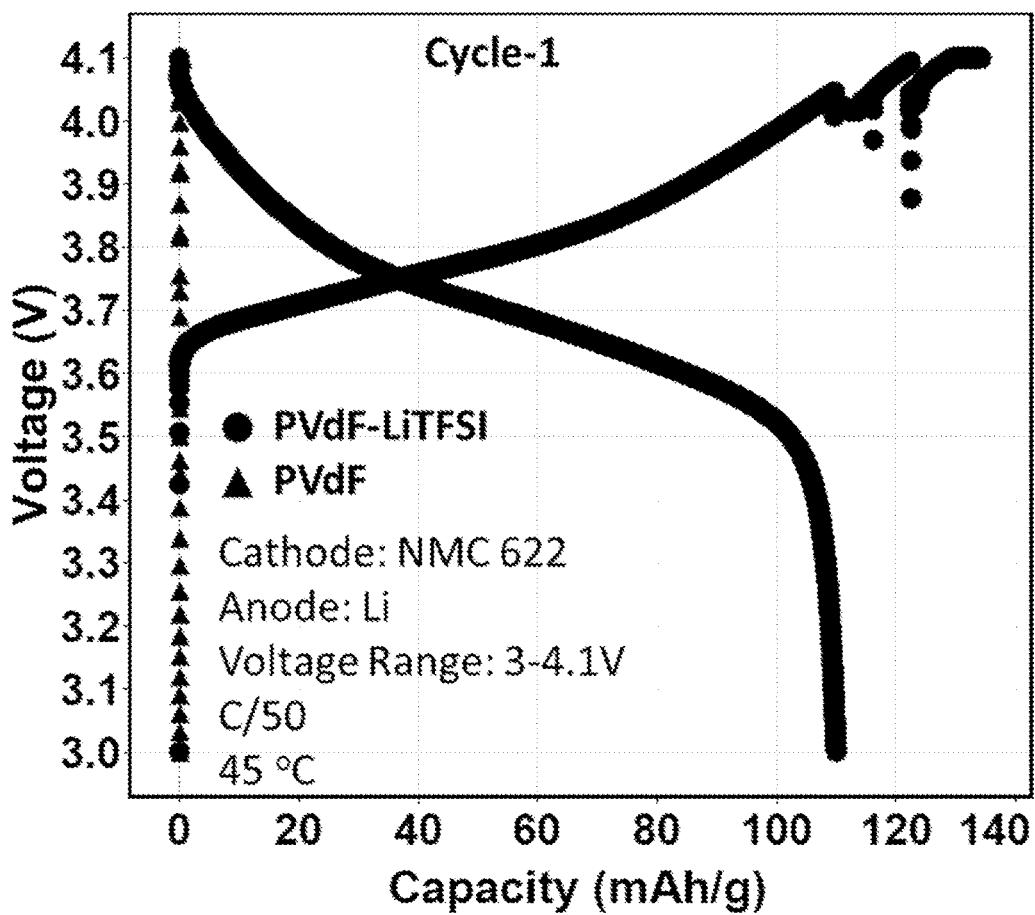
FIG. 1 illustrates the results of electrochemical testing of cells containing electrode formulations according to certain embodiments of the invention.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely, as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A "C-rate" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

The term "solid-state electrolyte" as used herein is used primarily to distinguish from electrolyte formulations where the formulation is an entirely liquid phase, almost entirely liquid phase, or substantially liquid phase.

The term "polymer" as used herein refers generally to a molecule whose structure is composed of multiple repeating units. The structure can be linear or branched. The term includes co-polymers of all types (such as, but not limited to, block, random, and alternating co-polymers).

The term "NNW" refers generally to cathode materials containing $LiNi_xMn_yCo_zO_w$ and includes, but is not limited to, cathode materials containing $LiNi_{0.33}Mn_{0.33}Co_{0.33}O_2$, $LiNi_{0.5}Mn_{0.3}Co_{0.2}O_2$. (sometimes referred to as NNW (532)), and $LiNi_{0.6}Mn_{0.2}Co_{0.2}O_2$ (sometimes referred to as NMC (622)).

The term "wt %" as used herein refers to the weight of the component as a percent of the total weight of the electrolyte formulation.

Ranges presented herein are inclusive of their endpoints. Thus, for example, the range 1 to 3 includes the values 1 and 3, as well as intermediate values.

Embodiments of the invention disclosed herein include a cathode that includes a conductive composite material. The conductive composite includes an inorganic ion-conductor and a polymer. The conductive composite can include a lithium salt.

Embodiments of the invention disclosed herein provide improvements in the lithium-ion conductivity of the cathode layer. The lithium-ion conduction in traditional batteries occurs via the liquid electrolyte that fills the pores of the cathode. In contrast, in a solid-state battery these same pores become void spaces that prevent the transport of lithium-ions. Certain embodiments disclosed herein at least partially fill these pores with a lithium-ion conductive material that is solid.

U.S. Patent Publication 2015/0188187, titled "Solid State Electrolyte and and Electrode Compositions" and filed Dec. 29, 2014, demonstrates a polyethylene oxide (PEO) based polymer composite included in a cathode. U.S. Patent Publication 2015/0188187 is incorporated by reference herein. While this PEO system performs adequately for primary cells that run at relatively low voltages, the PEO can degrade on charging to high voltages in lithium-ion secondary batteries. Embodiments of the present invention use a polyvinylene difluoride and $LiTi_{1.7}Al_{0.3}(PO_4)$(PVdF/LTAP) composite material for use in the electrode. In some embodiments, the composite material is incorporated into an NMC (622) cathode and the assembled battery demonstrates good capacity and cycle life.

The properties of the solid structure of the polymeric material for use in the electrode can be influenced by (i) the choice of polymer, (ii) the molecular weight of the polymer, (iii) the polydispersity of the polymer, (iv) the processing conditions, and (v) the presence of additives. While combinations of these factors are generally known, it is not necessarily predictable how these various factors will interact in a given application. Certain polymeric materials have shown utility for use in solid-state electrode formulations based on the combination of factors listed above.

Certain embodiments of the present invention include polymers without substantial ion-conducting properties. In some cases, embodiments of the present invention include polymers that may be considered non-conductors of lithium ions. In all cases, the polymer is combined with an inorganic material to form a composite material, and this composite material is used to form the solid-state electrode. Advantageously, the lithium ion conduction can be driven predominantly by the inorganic component, while the polymer component allows the electrode to be processed by standard electrode processing methods.

Certain embodiments of the invention employ polyvinylene diflouride (PVdF) as the polymer, which has significantly better voltage stability than polyethylene-oxide-based solid-state electrodes.

PVdF is a commodity polymer available in a variety of molecular weights, including molecular weights of 10,000,000 g/mol (or 10,000 kDa). PVdF has been used as a binder in conventional electrodes. The use of PVdF as a binder in conventional electrodes is technically distinct from the use described herein, and such use in electrodes is not predictive of the results achieved by certain of the embodiments disclosed herein.

PVdF can be processed into multiple structures, whether intended for a solid-state electrode or not. While PVdF is discussed herein as a possible polymeric material for use in the solid-state electrode, it is understood that other polymers with equivalent chemical, electrochemical, mechanical, and/or thermal properties can be used in place of or in addition to PVdF. Further, copolymers that include PVdF or PVdF-like polymers in at least one segment of the copolymer can be suitable for certain embodiments described herein. Thus, the embodiments described herein that refer to PVdF are understood to encompass other such polymeric and co-polymeric materials. Further, the embodiments described herein that refer to PVdF are understood to encompass routine chemical modifications to the chemical structure of the PVdF, where such routine chemical modifications do not substantially alter the structure, conductivity, and/or utility of the PVdF.

PVdF can be represented as structure (a):

where n indicates the number of repeat units in the polymer chain and is greater than 1. And the variations of PVdF can be represented as structure (b):

where $R_1$ and $R_2$ represent examples of the site of substitution that may be considered within the scope of the embodiments disclosed herein. Routine substitutions of groups for $R_1$ and $R_2$ include, but are not limited to, hydride groups, hydroxy groups, alkyl groups, alkenyl groups, alkynyl groups, aryl groups, iminyl groups, alkoxy groups, alkenoxy groups, alkynoxy groups, and aryloxy groups, each of which can contain further substitutions.

Embodiments of the present invention include an inorganic ion-conducting material included with the polymer component in the solid-state electrolyte formulation. A preferred example of an inorganic ion-conducting material is $Li_{1.3}Ti_{1.7}Al_{0.3}(PO_4)_3$ ("LTAP"). Generally speaking, inorganic phosphates including one or more transition metals and one or more alkali metals are a preferred class of ion-conducting inorganic material. Inorganic phosphates provide a good blend of conductivity, stability, processability and ease of synthesis. However, the inorganic ion-conducting materials could also be other types of inorganic solid state electrolytes, such as $Li_{6.5}La_3Zr_{1.5}Ta_{0.5}O_{12}$ ("LLZTO"), $Li_{10}SnP_2S_{12}$ ("LSPS"), $P_2S_5$—$Li_2S$ glass, $Li_{1+x+y}Al_xTi_{2-x}Si_yP_{3-y}O_{12}$, or $Li_2PO_2N$ ("LiPON").

The lithium salts used to create the improved solid-state electrolytes disclosed herein include, but are not limited to, lithium bis(trifluoromethanesulfonyl)imide ($CF_3SO_2NLiSO_2CF_3$) (also referred to herein as "LiTFSI"), lithium tetrafluoroborate ($LiBF_4$), lithium hexafluoroarsenate ($LiAsF_6$), lithium bis(oxalato)borate ($LiB(C_2O_4)_2$) (also referred to herein as "LiBOB"), lithium chlorate ($LiClO_4$), lithium hexafluorophosphate ($LiPF_6$), Lithium bis(fluorosulfonyl)imide (LiFSI), and lithium triflate ($LiCF_3SO_3$). Preferably, lithium bis(trifluoromethanesulfonyl)imide is used in the solid-state electrolyte formulations.

One potential drawback for inorganic materials in a composite with polymer materials is that impedance can occur at the interfaces between the two types of materials. The materials can experience poor surface contact at their interfaces, which results in poor ionic conduction across these interfaces. The poor contact is typically the result of the mismatch in mechanical properties of each material, and can be exacerbated by chemical or electrochemical incompatibility between the two materials.

In order for the lithium conduction path to occur primarily in the inorganic phase, several conditions should be met. First, the interfacial impedance between the polymer and the inorganic particle should be low enough such that the energy required for lithium ions to cross the interface is less than the energy required to move through the polymer. Second, the polymer matrix should substantially wet and adhere to the inorganic during repeated cycling. If the inorganic materials are in particle form, particle-to-particle lithium-ion transport is difficult over large gaps in an unsintered material. In the embodiments disclosed herein, there may not be a sintering step. Thus, the inorganic materials should be well dispersed throughout the polymer to help minimize particle-to-particle distances.

According to certain embodiments disclosed herein, the potential for interfacial impedance in the composites can be mitigated through the use of additives such as salts. The identity of the salt can depend on the identity of the polymer and inorganic material, with salts chosen to be chemically compatible with each material. The salts can aid in the dispersing, wetting, adhesion, and/or covalent bonding between the polymer and the inorganic material.

Surface treatment of the inorganic phase may be required. Suitable surface treatments include ionizing treatments, chemical etching, plasma treatments, and other forms of surface modification.

According to certain embodiments of the invention, the components of the electrode formulations can be combined in various weight percent ratios, where the weight percent refers to the percent of a component as compared to the total weight of the formulation. For example, the polymer can be present in the electrode formulation at a weight percent of from about 2% to about 15%, the inorganic ion conductor can be present in the electrode formulation at a weight percent of from about 40% to about 95%, the lithium salt can be present in the electrode formulation at a weight percent of from about 5% to about 35%, and the other additives can be present in the electrode formulation at a weight percent of from about 0% to about 20%.

The polymer can be present in the electrode formulation at a weight percent of about 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %. The inorganic ion conductor can be present in the electrode formulation at a weight percent of about 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, or 95 wt %. The lithium salt can be present in the electrode formulation at a weight percent of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, or 35 wt %. The other additives can be present in the electrode formulation at a weight percent of about 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

The solid-state batteries formed using the solid electrolyte formulations disclosed herein can be used with electrode configurations and materials known for use in solid-state batteries. The active material for use in the cathode can be any active material or materials useful in a lithium ion battery cathode, including the active materials in lithium metal oxides or layered oxides (e.g., $Li(NiMnCo)O_2$), lithium-rich layered oxide compounds, lithium metal oxide spinel materials (e.g., $LiMn_2O_4$, $LiNi_{0.5}Mn_{1.5}O_4$), olivines (e.g., $LiFePO_4$, etc.). Preferred cathode active materials include lithium cobalt oxide (e.g., $LiCoO_2$) and lithium layered oxides (e.g., $Li(Mn,Ni,Co)O_2$. Active materials can also include compounds such as silver vanadium oxide (SVO), metal fluorides (e.g., $CuF_2$, $FeF_3$), and carbon fluoride ($CF_x$). The finished cathode can include a binder material, such as poly(tetrafluoroethylene) (PTFE) or poly(vinylidene fluoride) (PVdF). More generally, the active materials for cathodes can include phosphates, fluorophosphates, fluorosulfates, silicates, spinels, and composite layered oxides. The materials for use in the anode can be any material or materials useful in a lithium ion battery anode, including lithium-based, silicon-based, titanium based oxides and carbon-based anodes.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Unless otherwise specified, all materials were used as received and all examples were carried out a high-purity argon-filled glove box (M-Braun, 02 and humidity content <0.1 ppm).

Electrode preparation. Electrodes were fabricated using a multi-step process. An inorganic ion-conductor, such as LTAP, was combined with an electrode active material, such as NMC 622. The amount of the inorganic ion-conductor can vary from greater than 0 weight percent to about 75 weight percent. In control electrodes, the amount of inorganic ion-conductor is 0 weight percent. The amount of the electrode active material can vary from about 25 weight percent to less than about 100 weight percent. In control electrodes, the amount of electrode active material is 100 weight percent. The inorganic ion-conductor and electrode active material were mixed together via mortar and pestle and then mixed in a solution of a lithium salt, such as LiTFSI, and polymer, such as PVdF. In some embodiments, the polymer solution does not contain lithium salt. The polymer can be present in this solution at a weight percentage of from a range of about 1% to about 15% and the lithium salt can be present in this solution at a weight percentage of from a range of about 0.5% to about 75%. The solution can be dissolved overnight prior to mixing with the inorganic ion-conductor and electrode active material, and a variety of solvents can be used. One example of a solvent is n-methyl-2-pyrrolidone (NMP). The slurry resulting from the combination of inorganic ion-conductor and electrode active material and salt/polymer solution was mixed again overnight prior to casting. The slurry is then cast directly onto stainless steel current collectors under air to produce a film. The slurry can also include a conductive carbon material, such as graphite. In some exemplary embodiments, slurries were formulated to contain from about 67 weight percent to about 80 weight percent of the inorganic ion-conductor and solvent mixture, from about 3.5 weight percent to about 16.5 polymer, 13.25 weight percent lithium salt, and about 3.25 weight percent conductive carbon. Films were allowed to dry at about 100 degrees Celsius for 1 to 2 hours followed by an additional drying step at about 100 degrees Celsius under vacuum for 12 hours.

Preparation of solid-state electrolyte films. Electrolytes were fabricated using a multi-step process. A lithium salt, such as lithium triflate, and a polymer, such as poly(ethylene oxide), were dissolved in a liquid solvent, such as acetonitrile. The resulting solution was mixed for a period of at least six hours, but typically overnight. The resulting slurry was cast on a sheet of Teflon using a doctor blade to produce a film that was 80 weight percent polymer and 20 weight percent lithium triflate. The resulting film was dried at 100 degrees Celsius for several hours followed by an additional drying step at about 100 degrees Celsius under vacuum for 12 hours.

Cell Assembly And Cycling. Cell stacks including embodiments of the cathodes described above, embodiments of the solid-state electrolytes described above, and lithium anodes were assembled and heat treated at 110 degrees Celsius for 1 hour under mild pressure (about 2 kg/cm$^2$). The cells were cells were sealed and cycled at 45 degrees Celsius between 3.0V and 4.1V at a rate of C/20 for cycles 1 and 2 and C/10 for cycles 3+ for both charge and discharge.

RESULTS

Figure 2:
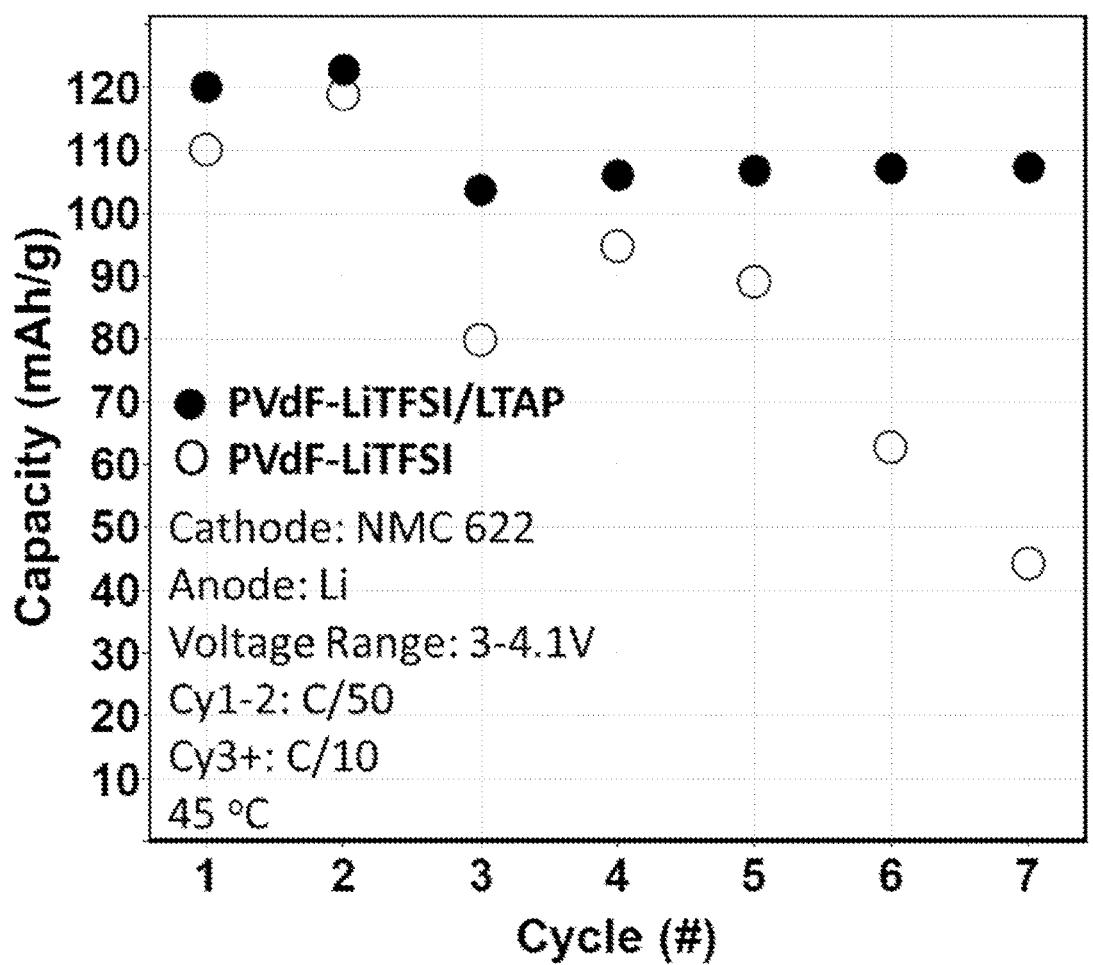
FIG. 2 illustrates the results of electrochemical testing of cells containing electrode formulations according to certain embodiments of the invention.
Figure 3:
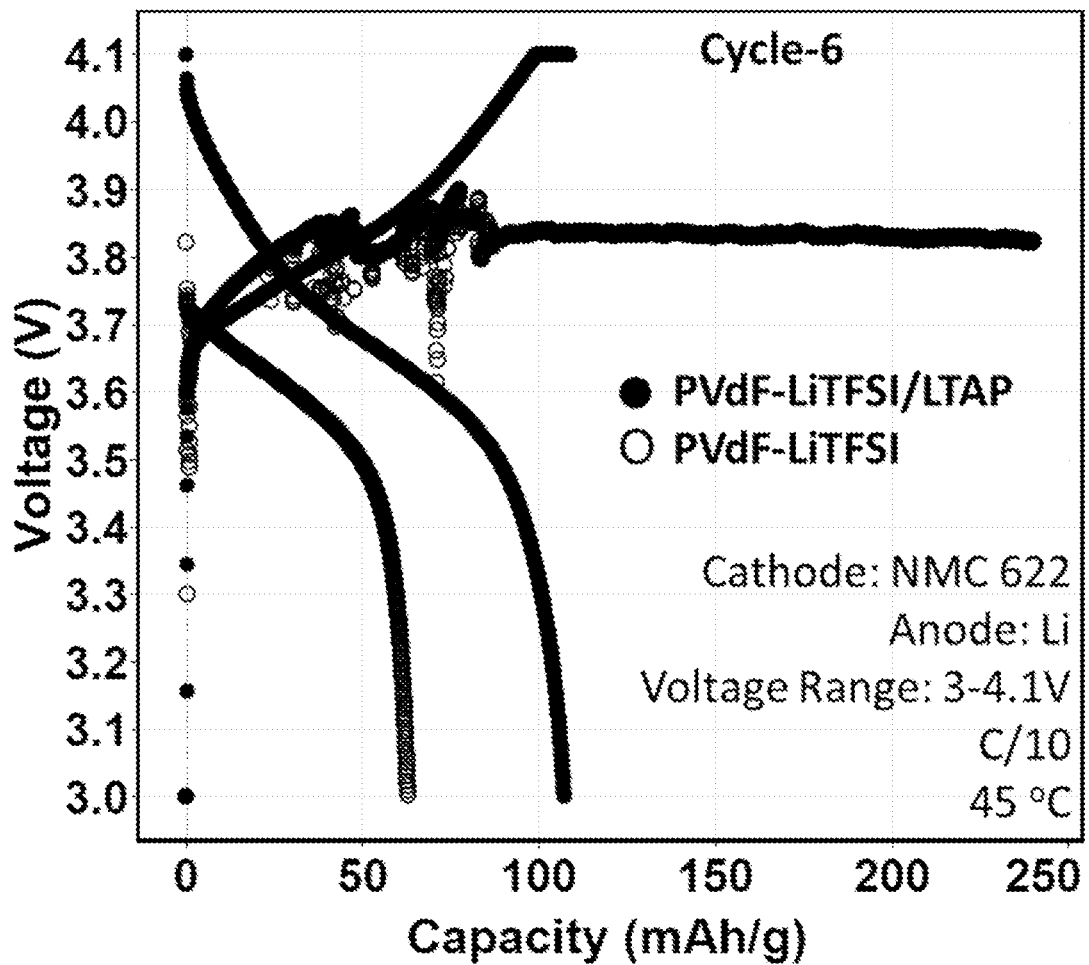
FIG. 3 illustrates the results of electrochemical testing of cells containing electrode formulations according to certain embodiments of the invention.

Data from the electrochemical characterization of the embodiments of the invention are illustrated in FIGS. 1, 2 and 3.

FIG. 1 illustrates the results of electrochemical testing of cells containing electrode formulations according to certain embodiments of the invention. FIG. 1 shows a voltage trace for the first cycle of a standard cathode formulated with and without a lithium salt. Each cathode was formulated with PVdF, and one contains lithium bis(trifluoromethane)sulfonamide (LiTFSI, $CF_3SO_2NLiSO_2CF_3$). The system without LiTFSI has comparatively less capacity as compared to the system including LiTFSI.

FIG. 2 illustrates the results of electrochemical testing of cells containing electrode formulations according to certain embodiments of the invention. FIG. 2 illustrates a plot of capacity versus cycle number for two cathode types, one containing polymer and salt (PVdF-LiTFSI) and the other containing a composite of inorganic ion-conductor, a polymer, and salt (PVdF-LiTFSI/LTAP). The composite systems shows stable cycling while the polymer system shows rapid capacity fade over the same number of cycles.

FIG. 3 illustrates the results of electrochemical testing of cells containing electrode formulations according to certain embodiments of the invention. FIG. 3 shows a voltage trace for the sixth cycle for a cathode containing polymer and salt (PVdF-LiTFSI) and for a cathode composite (PVdF-LiTFSI/LTAP). Failure for the polymer cathode system occurs on charging, while the composite cathode system shows smooth charging and discharging.

The comparison between the polymer/inorganic formulation and the polymer formulation leads to the conclusion that lithium ion conduction is being driven through the inorganic component. That is, the polymer component is not a strong lithium ion conductor, while the inorganic component is a lithium ion conductor. Thus, the improvement in capacity is likely due to the inorganic component, while the polymer component provides improved mechanical properties.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

We claim:

1. A lithium ion battery, comprising:
   an anode,
   a cathode comprising an unsintered film comprising an NMC material, an additive salt, an ion-conducting inorganic material that is not electrochemically active within an operating voltage of between 3.0V and 4.1V, and a polymer, and
   a solid-state electrolyte.

2. The lithium ion battery of claim 1 wherein the additive salt is selected from the group consisting of lithium bis(trifluoromethanesulfonyl)imide, lithium tetrafluoroborate, lithium hexafluoroarsenate, lithium bis(oxalato)borate, lithium chlorate, lithium bis(fluorosulfonyl)imide, and lithium triflate.

3. The lithium ion battery of claim 1, wherein the additive salt comprises lithium bis(trifluoromethanesulfonyl)imide.

4. The lithium ion battery of claim 1 wherein the polymer is ion-conducting.

5. The lithium ion battery of claim 1 wherein the polymer comprises PEO.

6. The lithium ion battery of claim 1 wherein the polymer is non ion-conducting.

7. The lithium ion battery of claim 1 wherein the polymer comprises PVdF.

8. The lithium ion battery of claim 1 wherein the ion-conducting inorganic material is selected from the group consisting of $Li_{1.3}Ti_{1.7}Al_{0.3}(PO_4)_3$, $Li_{6.5}La_3Zr_{1.5}Ta_{0.5}O_{12}$, $Li_{10}SnP_2S_{12}$, $P_2S_5$—$Li_2S$ glass, $Li_{1+x+y}Al_xTi_{2-x}Si_yP_{3-y}O_{12}$, or $Li_2PO_2N$.

9. The lithium ion battery of claim 1 wherein the ion-conducting inorganic material comprises a phosphate group.

10. The lithium ion battery of claim 1 wherein the ion-conducting inorganic material comprises $Li_{1.3}Ti_{1.7}Al_{0.3}(PO_4)_3$.

11. The lithium ion battery of claim 1 wherein the polymer comprises PVdF, the additive salt comprises lithium bis(trifluoromethanesulfonyl)imide, and the ion-conducting inorganic material comprises $Li_{1.3}Ti_{1.7}Al_{0.3}(PO_4)_3$.

12. The lithium ion battery of claim 1 wherein the ion-conducting inorganic material comprises $Li_{6.5}La_3Zr_{1.5}Ta_{0.5}O_{12}$.

13. The lithium ion battery of claim 1 wherein the ion-conducting inorganic material comprises $Li_{10}SnP_2S_{12}$.

14. The lithium ion battery of claim 1 wherein the ion-conducting inorganic material comprises $P_2S_5$—$Li_2S$ glass.

15. The lithium ion battery of claim 1 wherein the ion-conducting inorganic material comprises $Li_{1+x+y}Al_xTi_{2-x}Si_yP_{3-y}O_{12}$.

16. The lithium ion battery of claim 1 wherein the ion-conducting inorganic material comprises $Li_2PO_2N$.

* * * * *